(12) United States Patent
Patel et al.

(10) Patent No.: US 9,337,911 B2
(45) Date of Patent: May 10, 2016

(54) METHOD AND SYSTEM FOR A LOW-COMPLEXITY SOFT-OUTPUT MIMO DETECTION

(71) Applicant: MaxLinear, Inc., Carlsbad, CA (US)

(72) Inventors: Dimpesh Patel, North York (CA); Mahdi Shabany, Tehran (IR); Glenn Gulak, Toronto (CA)

(73) Assignee: MaxLinear, Inc., Carlsbad, CA (US)

( * ) Notice: Subject to any disclaimer, the term of this patent is extended or adjusted under 35 U.S.C. 154(b) by 0 days.

(21) Appl. No.: 14/158,546

(22) Filed: Jan. 17, 2014

(65) Prior Publication Data

US 2015/0016557 A1      Jan. 15, 2015

Related U.S. Application Data

(63) Continuation of application No. 13/149,743, filed on May 31, 2011, now Pat. No. 8,670,508.

(60) Provisional application No. 61/349,752, filed on May 28, 2010.

(51) Int. Cl.
*H04B 7/04* (2006.01)
*H04L 25/03* (2006.01)

(52) U.S. Cl.
CPC ........ *H04B 7/0456* (2013.01); *H04L 25/03203* (2013.01)

(58) Field of Classification Search
USPC ......... 375/259, 260, 267, 285, 316, 340, 341, 375/346, 347, 349
See application file for complete search history.

(56) References Cited

U.S. PATENT DOCUMENTS

| | | | |
|---|---|---|---|
| 6,675,187 B1 | 1/2004 | Greenberger | |
| 7,489,746 B1 | 2/2009 | Awater et al. | |
| 8,255,775 B2 * | 8/2012 | Chang et al. | 714/780 |
| 8,266,510 B1 | 9/2012 | Chen et al. | |

(Continued)

OTHER PUBLICATIONS

International Search Report and Written Opinion for International Patent Application No. PCT/US2010/35989, mailed on Jul. 28, 2010, 8 pages.

(Continued)

*Primary Examiner* — Siu Lee
(74) *Attorney, Agent, or Firm* — Kilpatrick Townsend & Stockton LLP

(57) ABSTRACT

An approach for Soft-output K-Best MIMO detection comprises computing an estimated symbol vector and Log-Likelihood Ratio (LLR) values for transmitted bits. The approach includes a relevant discarded paths selection process, a last-stage on-demand expansion process, and a relaxed LLR computation process. The relevant discarded paths selection process includes analyzing the K-Best paths and discarded paths at each intermediate tree level and selecting only those discarded paths for further processing that will help in LLR computation for at least one of the transmitted bits. The last-stage on-demand expansion process includes expanding K paths at the tree level $2N_T-1$ ($N_T$=number of transmit antennas) on-demand to only $2K-1$ lowest Partial Euclidean Distance (PED) paths at last tree level $2N_T$. The relaxed LLR computation scheme includes approximating LLR computations by assuming that discarded path PED is greater than or equal K-Best path PED.

15 Claims, 9 Drawing Sheets

(56) References Cited

U.S. PATENT DOCUMENTS

| | | | |
|---|---|---|---|
| 8,351,549 B1 | 1/2013 | Choi et al. | |
| 8,670,508 B2* | 3/2014 | Patel et al. | 375/341 |
| 2007/0162268 A1 | 7/2007 | Kota et al. | |
| 2007/0226287 A1 | 9/2007 | Lin et al. | |
| 2008/0279299 A1 | 11/2008 | Reuven et al. | |
| 2008/0298478 A1* | 12/2008 | Kim et al. | 375/260 |
| 2009/0232232 A1* | 9/2009 | Duvaut et al. | 375/260 |
| 2009/0232241 A1* | 9/2009 | Shabany et al. | 375/262 |
| 2009/0296842 A1 | 12/2009 | Papadopoulos et al. | |
| 2010/0293210 A1 | 11/2010 | Sima et al. | |
| 2010/0303176 A1* | 12/2010 | Lilleberg et al. | 375/341 |
| 2011/0264721 A1 | 10/2011 | Patel et al. | |
| 2012/0134451 A1 | 5/2012 | Patel et al. | |
| 2012/0269303 A1* | 10/2012 | Paker et al. | 375/341 |

OTHER PUBLICATIONS

International Preliminary Report on Patentability for International Patent Application No. PCT/US2010/35989, mailed on Dec. 1, 2011, 9 pages.

Andraka, "A survey of CORDIC algorithms for FPGA based computers," Proc. of the 1998 ACM/SIGDA sixth international symposium on Field Programmable Gate Arrays, Feb. 1998, 10 pages.

Boleng, et al., "Load balanced parallel QR decomposition on Shared Memory Multiprocessors," Parallel Computing, Sep. 2001, vol. 27, pp. 1321-1345.

Davis, "Scaled and decoupled Cholesky and QR decompositions with application to spherical MIMO detection," in Proc. Of WCNC, 2003, vol. 1, pp. 326-331.

DeLosme, et al., "CORDIC algorithms in Four Dimensions," Advanced Signal Processing Algorithms, Architectures, and Implementations, Proc. SPIE, Jul. 1990, vol. 1348, No. 1, pp. 349-360.

El-Amawy, et al., "Parallel VLSI algorithm for Scalable Inversion of Dense Matrices," Computers and Digital Techniques, IEEE Proceedings, Nov. 1989, vol. 136, No. 6, pp. 575-580.

Golub, et al., Matrix Computations, 3rd ed. Baltimore, MD: John Hopkins University Press, 1996, pp. 1-694.

Hsiao, et al., "Householder CORDIC Algorithms," IEEE Transactions on Computers, Aug. 1995, vol. 44, No. 8, pp. 990-1001.

Hwang, et al., "A Low Complexity Complex QR Factorization Design for Signal Detection in MIMO OFDM Systems," in Proc. IEEE ISCAS 2008, May 2008, pp. 932-935.

Lai, et al., "A Modified Sorted-QR Decomposition Algorithm for Parallel Processing in MIMO Detection," Proc. IEEE ISCAS 2009, May 2009, pp. 1045-1408.

Maltsev, et al., "Triangular Systolic Array with Reduced Latency for QR-decomposition of Complex Matrices," in Proc. IEEE ISCAS 2006, May. 2006, pp. 385-388.

Patel et al., "How to migrate HDL Design to ATE Test Plan Quickly and Efficiently the V93K-Test Generator Tool," CMC application note, Jun. 27, 2008, 10 pages.

Salmela, et al., "Complex-valued QR decomposition implementation for MIMO receivers," in Proc. IEEE ICASSP 2008, Apr. 2008, pp. 1433-1436.

Shabany, et al., "A 0.13um CMOS 655Mb/s 4x4 64-QAM K-Best MIMO detector," Proc. IEEE Int. Solid-State Circuits Conf., 2009, pp. 256-258.

Shabany, et al., "Scalable VLSI Architecture for K-Best Lattice Decoders," in Proc. IEEE ISCAS 2008, May 2008, pp. 940-943.

Singh, et al., "VLSI Architecture for Matrix Inversion using Modified Gram-Schmidt based QR Decomposition," International Conference on VLSI Design, Jan. 2007, pp. 836-841.

Sobhanmanesh, et al., "Parametric minimum hardware QR-factoriser Architecture for V-BLAST Detection," in IEEE Proceedings on Circuits, Devices and Systems, Oct. 2006, vol. 153, No. 5, pp. 433-441.

Volder, "The CORDIC Trigonometric Computing Technique," in IRE Trans. Electronic Computers, Sep. 1959, vol. 8, No. 3, pp. 330-334.

Walther, "A Unified Algorithm for Elementary Functions," in Proc. AFIPS Spring Joint Computing Conf., Nov. 1971, vol. 38, pp. 379-385.

Wang, et al., "A Unified View of CORDIC Processor Design," in Proc. of IEEE 39th Midwest Symposium on Circuits and Systems, Aug. 1996, vol. 2, pp. 852-855.

International Search Report and Written Opinion for International Patent Application No. PCT/US2011/038642, mailed on Oct. 11, 2011, 12 pages.

International Preliminary Report on Patentability for International Patent Application No. PCT/US2011/038642, mailed on Dec. 13, 2012, 7 pages.

Non-Final Office Action for U.S. Appl. No. 12/786,288, mailed on Mar. 25, 2013, 14 pages.

Non-Final Office Action for U.S. Appl. No. 13/149,743 mailed on Apr. 4, 2013, 14 pages.

Notice of Allowance for U.S. Appl. No. 13/149,743, mailed on Oct. 17, 2013, 12 pages.

Non-Final Office Action for U.S. Appl. No. 12/786,288, mailed on march 25, 2013, 14 pages.

Final Office Action for U.S. Appl. No. 12/786,288, mailed on Jan. 9, 2014, 9 pages.

Non-Final Office Action for U.S. Appl. No. 12/786,288, mailed on Sep. 11, 2014, 10 pages.

Non-Final Office Action for U.S. Appl. No. 12/786,288, mailed on May 15, 2015, 9 pages.

Final Office Action for U.S. Appl. No. 12/786,288, mailed on Sep. 3, 2015, 10 pages.

* cited by examiner

METHOD AND SYSTEM FOR A LOW-COMPLEXITY SOFT-OUTPUT MIMO DETECTION

CROSS-REFERENCES TO RELATED APPLICATIONS

This application claims priority to and is a continuation of Ser. No. 13/149,743, filed on May 31, 2011 and entitled "METHOD AND SYSTEM FOR A LOW-COMPLEXITY SOFT-OUTPUT MIMO DETECTION", which application claims the benefit under 35 USC §119(e) of U.S. Application No. 61/349,752, filed on May 28, 2010, and entitled "METHOD AND SYSTEM FOR A LOW-COMPLEXITY SOFT-OUTPUT MIMO DETECTION", the contents of which are incorporated herein by reference in their entirety.

The present application is related to U.S. application Ser. No. 12/786,288, filed May 24, 2010, entitled "Signal Processing Block for a Receiver in Wireless Communication"; the content of which is incorporated herein by reference in its entirety.

The following publications provide additional technical information in connection with the present application:

M. Shabany, "VLSI Implementation of Digital Signal Processing Algorithms for MIMO/SISO Systems," *Ph.D. Thesis, University of Toronto*, 2009.

G. Foschini and M. Gans, "On limits of wireless communications in a fading environment when using multiple antennas," *Wireless Personal communications*, vol. 6, no. 3, pp. 311-334, 1998.

E. Biglieri, R. Calderbank, A. Constantinides, A. Goldsmith, A. Paulraj, and H. V. Poor, *MIMO Wireless communications*. Cambridge Univ. Press, 2007.

J. Andrews, A Ghosh, and R. Muhamed, *Fundamentals of WiMAX: Understanding Broadband Wireless Networking*. Pearson Education Inc., 2007.

A. Salvekar, S. Sandhu, Q. Li, M.-A. Vuong, and X. Qian, "Multiple-antenna technology in WIMAX systems," *Intel Technology Journal*, vol. 8, no. 3, August 2004.

W. Standard, "IEEE 802.16 standard for local and metropolitan area networks, part 16: Air interface for fixed broadband wireless access systems," *WiMAX Standard*, 2004.

W. Forum, "WiMAX forum mobile system profile release 1.0 approved specification (revision 1.4.0:2007-05-02)," WiMAX Forum, May 2005.

A. Paulraj, R. Nabar, and D. Gore, *Introduction to Space-Time Wireless communications*. Cambridge Univ. Press, 2003.

Z. Guo and P. Nilsson, "Algorithm and implementation of the K-Best sphere decoding for MIMO detection," *IEEE Journal on Selected Areas in Communication*, vol. 24, no. 3, pp. 491-503, March 2006.

M. O. Damen, H. E. Gamal, and G. Caire, "On maximum-likelihood detection and the search for the closest lattice point, *IEEE Trans. Inform Theory*, vol. 49, o. 10, pp. 2389-2402, October 2003.

B. M. Hochwald and S. ten Brink, "Achieving Near-Capacity on a Multiple-Antenna Channel," *IEEE Trans. Commun.*, vol. 51, pp. 389-399, March 2003.

S. Haykin, M. Sellathurai, Y. deJong, and T. Willink, "Turbo-MIMO for wireless communications," *IEEE Commun. Mag.*, vol. 42, no. 10, pp. 48-53, October 2004.

P. W. Wolniansky, G. J. Foschini, G. D. Golden, and R. A. Valenzuela, "V-BLAST: An architecture for realizing very high data rates over the rich-scattering wireless channel," in *Proc. URSI ISSSE*, pp. 295-300, 1998.

E. Agrell, T. Eriksson, A. Vardy, and K. Zeger, "Closest Point Search in Lattices," *IEEE Trans. On Inf. Theory*, vol. 48, no. 8, pp. 2201-2214, August 2002.

M. O. Damen, A. Chkeif, and J. C. Belfiore, "Lattice code decoder for space-time codes," *IEEE communications Letters*, vol. 4, no. 5, pp. 161-163, May 2000.

U. Fincke and M. Pohst, "Improved methods for calculating vectors of short length in a lattice, including a complexity analysis," *Math. Comput.*, vol. 44, pp. 463-471, April 1985.

J. Jalden and B. Ottersten, "On the Complexity of Sphere Decoding in Digital Communications," *IEEE Trans. Signal Process.*, vol. 53, no. 4, pp. 1474-1484, April 2005.

K. W. Wong, C. Y. Tsui, R. S. K. Cheng, and W. H. Mow, "A VLSI architecture of a K-Best lattice decoding algorithm for MIMO channels," *Proc. IEEE Int. Symp. Circuits Syst.*, vol. 3, pp. 273-276, May 2002.

J. B. Anderson, "Limited search trellis decoding of convolutional codes," *IEEE Trans. Inf. Theory*, vol. 35, no. 5, pp. 944-955, September 1989.

Y. L. de Jong and T. J. Willink, "Iterative tree search detection for MIMO wireless systems," *Proc. IEEE 56th Veh. Technol. Conf*, pp. 1041-1045, 2002.

M. Shabany and P. G. Gulak, "A 0.13 μm CMOS 655 Mb/s 4×4 64-QAM K-Best MIMO detector," *Proc. IEEE Int. Solid-State Circuits Conf*, pp. 256-257, 2009.

S. Chen, T. Zhang, and Y. Xin, "Relaxed K-best MIMO Signal Detector Design and VLSI Implementation," *IEEE Trans. On Very Large Scale Integration VLSI Systems*, vol. 15, no. 3, pp. 328-337, March 2007.

M. Shabany and P. G. Gulak, "Scalable VLSI Architecture for K-Best Lattice Decoders," *Proc. IEEE Int. Symp. Circuits Syst.*, pp. 940-943, 2008.

M. Wenk, M. Zellweger, A. Burg, N. Felber, and W. Fichtner, "K-Best MIMO detection VLSI architectures achieving up to 424 Mbps," *Proc. IEEE Int. Symp. Circuits Syst.*, pp. 1151-1154, 2006.

H.-L. Lin, R. C. Chang, and H. Chan, "A high-speed SDM-MIMO decoder using efficient candidate search for wireless communication," *IEEE Trans. On Circuits, Syst. II*, vol. 55, no. 3, pp. 289-293, March 2008.

S. Chen and T. Zhang, "Low power Soft-output Signal Detector design for Wireless MIMO Communication Systems," in *Proc. International Symp. On Low Power Electronics and Design*, pp. 232-237, 2007.\

D. Wubben, R. Bohnke, V. Kuhn, and K. Kammeyer, "Efficient algorithm for decoding layered space-time codes," *Electronics Letters*, vol. 37, no. 22, pp. 1348-1350, October 2001.

The present application incorporates herein by reference the entire contents of all of the above publications.

BACKGROUND OF THE INVENTION

The present invention relates to multiple-input multiple-output technology (MIMO) and more particularly to methods and systems for a low-complexity K-best detection.

Multiple-input multiple-output (MIMO) technology is employed in today's wireless digital communication systems to improve spectral-efficiency and robustness to fading without increasing power or bandwidth. The term MIMO refers to communication systems that use an array of antennas at both the transmitter and the receiver. In many wireless standards such as IEEE 802.16m and LTE-Advanced, MIMO may be combined with channel coding to further improve the system diversity. However, a low-complexity high-throughput VLSI implementation of near-optimum 4×4 MIMO detectors has been a major design challenge for high-order quadrature amplitude modulation (QAM) schemes. Near-optimum MIMO detectors offer scalable complexity, while providing comparable performance to the Maximum Likelihood (ML) detector. Depending on how MIMO detectors carry out the non-exhaustive search, they generally fall into two main categories: depth-first and breadth-first search. Among the breadth-first search detectors, the K-Best algorithm guarantees an SNR-independent fixed throughput with performance close to ML. Furthermore, its feed-forward detection approach makes it particularly attractive for pipelined VLSI implementation.

BRIEF SUMMARY OF THE INVENTION

In an embodiment of the present invention, a method for soft-output K-Best MIMO detection includes computing an estimated symbol vector and Log-likelihood Ratio (LLR) values for transmitted bits. The method further includes retaining, processing, and utilizing paths discarded from the intermediate tree levels, in addition to the exhaustively extended paths at the last tree level, to attain Bit Error Rate (BER) performance improvement. In addition, the method includes one or more of the following processes: a relevant discarded paths selection process, a last-stage on-demand expansion process, and a relaxed LLR computation process.

In an embodiment, the relevant discarded paths selection process includes analyzing the K-Best paths and discarded paths at each intermediate tree level, and selecting only those discarded paths for further processing that will help in LLR computation for at least one of the transmitted bits, so that the required number of path augmentation, partial Euclidean Distance (PED) computations and PED comparisons is significantly reduced.

In an embodiment, the last-stage on-demand expansion process includes expanding K paths (for K-Best algorithm) at the tree level $2N_T-1$ ($N_T$ being the number of transmit antennas) on-demand to only $2K-1$ lowest PED paths at the last tree level $2N_T$, wherein the on-demand path extension is configured such that these $2K-1$ paths have the lowest PED values (to be directly utilized for LLR computation) among the total $K*\sqrt{Q}$ (where Q is the constellation order) paths, and that they are sorted in the order of ascending PED values, so that the number of path augmentations and PED computations is reduced from $K*\sqrt{Q}$ to only $2K-1$ and the number of PED comparisons is reduced from $K*\sqrt{Q}$ to 0.

In an embodiment, the relaxed LLR computation process includes approximating LLR computations by making the assumption that discarded path PED is greater than or equal K-best path PED, so that there is no PED comparisons required and that the relaxed LLR computation only results in minor BER performance loss.

In an embodiment, a system for implementing the soft-output K-Best MIMO detection includes a deeply pipelined and highly parallel architecture of a Soft-output K-Best MIMO detector. In an embodiment, the soft-output K-best MIMO detector is used in a multiple-input and a multiple-output (MIMO) receiver system supporting quadrature amplitude modulations (M-QAM with M being an integer). The architecture is designed to be area and power efficient, while offering high detection throughput. Through physical synthesis, the architecture has been proven to support error correction codes (ECC) coded data rates up to 1 Gbps with a detection throughput of up to 2 Gbps; so that the system satisfies the aggressive requirements of the latest 4 G wireless standards such as IEEE 802.16m and LTE-Advanced.

In another embodiment, a soft-output K-Best MIMO detector includes an input terminal configured to receive a vector Z and an upper-triangular matrix R. The detector also includes a plurality of processing elements arranged in a pipelined architecture. The pipelined structure contains a number of levels that process the vector Z together with matrix R to generate Log-likelihood ratio (LLR) values for transmitted bits. The number of levels equals twice the number of transmit antennas in the MIMO system. In an embodiment, the plurality of processing elements are configured to retain selected discarded paths from intermediate levels within the total number of levels, compute Partial Euclidean Distance (PED) values in the intermediate levels utilizing the retained selected discarded paths and sort the PED values.

In yet another embodiment, a device for soft-output K-Best MIMO detecting for M-QAM MIMO receivers includes a multiplication block, a Note Bit Occurrences (NBO) block configured to populate bit occurrence tables using the current level K-Best paths and the accumulated selected (chosen) discarded paths from previous levels, a Tag Discarded Paths (TDP) block configured to tag a discarded path, a Fill_MinPEDTable_I block configured to populate a minimum PED table, and a Fill_MinPEDTable_II block coupled to the Fill_MinPEDTable_I block and being configured update the minimum PED table using the selected discarded paths. In an embodiment, the multiplication block performs multiplication of one of the operands with any of −7, −5, −3, −1, +1, +3, +5 or +7 representing real and imaginary parts of a constellation symbol using only one adder and 4 multiplexors, thus yielding very small area and power requirements and small critical path delay.

In an embodiment, the Note Bit Occurrences (NBO) block uses a plurality of KB_NBO (K-Best NBO) sub-blocks and a plurality of DP_NBO (Discarded Path NBO) sub-blocks. Each of the KB_NBO sub-blocks include a reset mechanism using logical OR and AND operations to reset the KB bit occurrence table. Each of the DP_NBO sub-blocks includes a tagging mechanism using logical OR and AND operations to recognize and tag the bits that belong to the selected relevant discarded paths.

In an embodiment, the Tag Discarded Paths (TDP) block and its DP_TDP sub-block can detect whether the current discarded path will yield useful information for LLR computation in the future and select (tag) the discarded path in the event that it is relevant.

In an embodiment, single bit sub-blocks of the Fill_MinPEDTable_I and the Fill_MinPEDTable_II blocks use special reset mechanisms and other novel architecture to reduce gate count and power consumption requirements.

BRIEF DESCRIPTION OF THE DRAWINGS

In the following drawings, emphasis is placed upon illustrating the principles of the invention. The various embodiments and advantages of the present invention will be more fully understood when considered with respect to the following detailed description, appended claims and accompanying drawings wherein:

DETAILED DESCRIPTION OF THE INVENTION

Figure 1:
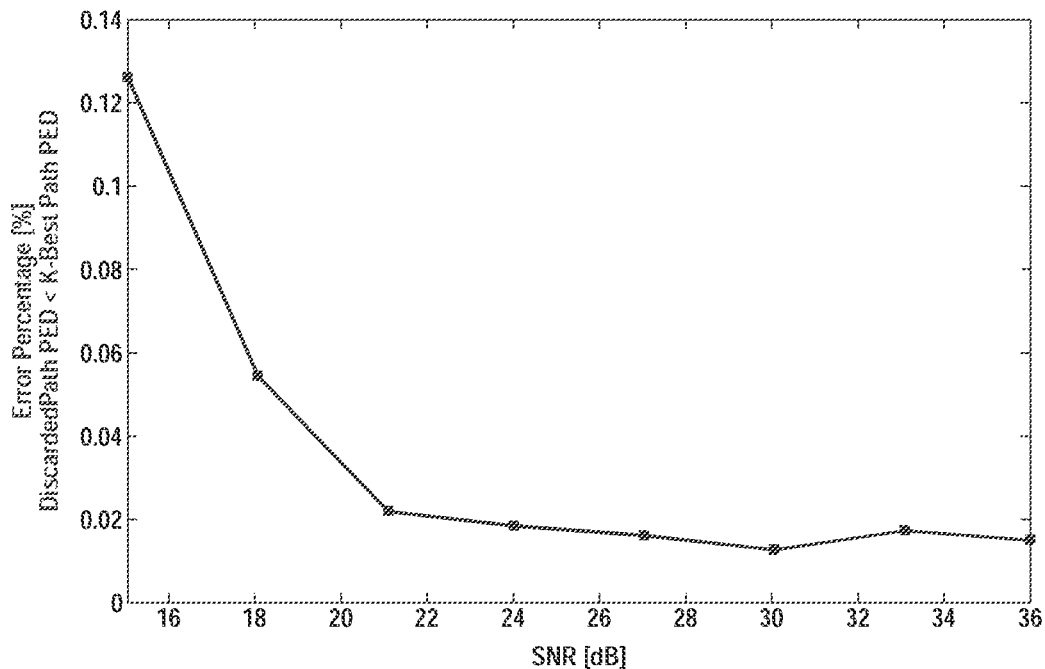
FIG. 1 is an error percentage plot of a relaxed LLR computation scheme according to an embodiment of the present invention.

The following notation is used throughout the present application.

| Term | Definition |
|---|---|
| BER | Bit Error Rate |
| ECC | Error Correction Code |
| LLR | Log Likelihood Ratio |
| MIMO | Multiple Input Multiple Output |
| MKSE | Modified K-best Schnorr-Euchner |
| PED | Partial Euclidean Distance |
| QAM | Quadrature Amplitude Modulation |
| RVD | Real-Value Decomposition |
| SPE | Soft Processing Element |
| SNR | Signal-to-Noise Ratio |
| ZF | Zero-Forcing |

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Before describing in detail embodiments that are in accordance with the present invention, it should be noted that the figures are for ease of explanation of the basic teachings of the present invention only. The figures being block diagrams or circuit diagrams provide only the concept of the preferred embodiment of the invention. Further, the exact circuit designs and the specifications of the passive and active devices for each of the functions described in the embodiments will be within the skill of the art after the following teachings of the present invention have been read and understood. The figures are represented by symbols and nomenclature that are standard in the industry.

A complex $N_R \times N_T$ MIMO system can be modeled as an equivalent $2N_R \times 2N_T$ real system using Real Value Decomposition (RVD):

$$Y = HS + V \quad (1)$$

Where S is the transmitted signal vector, Y is the received signal vector, H is the $N_R \times N_T$ channel matrix response, and V is the additive White Gaussian Noise vector. The dimension of S, Y and H are $2N_T \times 1$, $2N_R \times 1$ and $2N_R \times 2N_T$, respectively. Each symbol in S is drawn from a symmetric M-QAM constellation $\Omega = \{-\sqrt{M}+1, \ldots, -1, 1, \ldots +\sqrt{M}-1\}$. Using QR-decomposition, the channel matrix H can be decomposed into a unitary matrix Q and an upper-triangular $2N_R \times 2N_T$ matrix R. Performing a nulling operation on the received signal by $Q^H$ results in the updated system equation:

$$Z = Q^H Y = RS + Q^H V \quad (2)$$

Where $Q^H$ is the conjugate transpose of the matrix Q, i.e., $Q^H = (Q^T)^*$.

The objective of the MIMO detection system is to find the closest transmitted vector S based on the observation Y, such that the Euclidean distance $\|Z - RS\|^2$ is minimized.

The Soft-output K-Best MIMO detection method and system are described for a 4×4 64-QAM system. It should be understood that the concept and architecture disclosed in this invention can be applied to any order (size) of quadrature amplitude modulation such as 16-QAM, 256-QAM or any other order of QAM. In an embodiment of the present invention, a method for soft-output K-best MIMO detection computes the estimated symbol vector and Log-likelihood Ratio (LLR) values for the transmitted bits. The LLR of bit $x_k$, the k-th bit of the transmitted bit streams x, is defined as:

$$LLR(xk \mid z) = \ln \frac{P[xk = 1 \mid z]}{P[xk = 0 \mid z]} \quad (3)$$

$$\approx \min_{x \in S_k^{(1)}} \|z - Rx\|^2 - \min_{x \in S_k^{(0)}} \|z - Rx\|^2 \quad (4)$$

Where $S_k^{(1)}$ and $S_k^{(0)}$ represent all vector $x_k$ with bit position $x_k$ being "1" and "0", respectively.

This algorithm can be easily scaled to high-order constellations (e.g., 256-QAM, 1024-QAM) and large number of antennas. The algorithm retains, processes and utilizes paths discarded from the intermediate tree levels (hereinafter, tree level and level will be used alternatively and denote a processing stage in a pipelined architecture, e.g., at each level, the best paths (K-Best paths) are retained and other paths may be discarded (discarded paths)), in addition to the exhaustively extended paths at the last tree level, to attain considerable Bit Error Rate (BER) performance improvement compared to the Hard K-Best Detection scheme.

In a $2N_R \times 2N_T$ real-valued MIMO system with channel characteristic matrix H, the detection task is to find K lowest PED paths per level and $\sqrt{Q}$ children per path in a tree with $2N_T$ levels. The task of a Hard K-Best detector is to find the lowest PED $2N_T \times 1$ vector at the last level of the tree. On the other hand, the task of a Soft K-Best detector is to compute LLR values for $(2N_T)(\log_2(Q)/2)$ transmitted bits using all of the existing paths at the last level and the discarded paths from the intermediate levels.

In some embodiments, the K-Best algorithm explores the tree from the root to the leaves by expanding each level and selecting the K best candidates in each level. Let us consider K surviving nodes in level i. Each of these nodes has $\sqrt{Q}$ possible children in level i+1, from the symmetry in the Q-QAM constellation. The K-Best algorithm visits all these children and calculates their Partial Euclidean Distances (PED) values resulting in $K\sqrt{Q}$ children at level i+1. Once the PED values are calculated, the K-Best algorithm sorts all these $K\sqrt{Q}$ children and selects the K best children as the surviving nodes in level i+1. All of the existing paths at the last level are considered to calculate the LLR values.

An exemplary Soft-output K-Best detection algorithm for computing the LLR values for $(2N_T)(\log_2(Q)/2)$ bits according to an embodiment of the present invention is provided below.

---

(1) Find the K-Best children of level 1. ($K_1$)
(2) For l = 2:1:$2N_T$–L–1 (L being the number of tree levels for which relevant Discarded paths need to be collected)
    (2.1) Find the K-Best paths at level l using the On-Demand child expansion scheme ($K_l$).
    End
(3) For l = $2N_T$–L: 1:$2N_T$–1
    (3.1) Find the K-Best paths at level l using the On-Demand child expansion scheme.
    (3.2) Populate a Bit Occurrences table for symbols corresponding to level l –>1 ($2*l*(\log_2(Q)/2)$ entries) using the K-Best paths $K_l$.
    (3.3) Update the Bit Occurrences table using the discarded paths accumulated from all previous levels ($D_{l-1\to 1}$). Also, copy ($D_{l-1\to 1}$) to ($D_{l\to 1}$).
    (3.4) Examine each of the K–1 discarded paths at the current level ($D_l$) and select it for further processing (add to $D_{l\to 1}$) only if it fills at least one void entry in the Bit Occurrences table.
    (3.5) Perform ZF augmentation and PED update for each discarded path in $D_{l\to 1}$ to level l+1.
    End
(4) At level l = $2N_T$
    (4.1) Sort the discarded paths from ($D_{2NT-1\to 1}$) in the ascending order of PED.
    (4.2) Extend the K-Best paths at level $2N_T$–1 ($K_{2NT-1}$) to exactly K paths at level $2N_T$ using ZF augmentation.
    (4.3) Use these K paths at level $2N_T$ to fill the MinPED table for the first $(2N_T-1)(\log_2(Q)/2)$ bits.
    (4.4) To compute LLR for the last ($\log_2(Q)/2$) bits:
        (4.4.1) Use the lowest PED ZF augmented path at level $2N_T$ to fill exactly half the MinPED table for these bits.
        (4.4.2) Perform On-Demand extension of ($K_{2NT-1}$) and use at most 2K–1 paths, in the order of ascending PEDs, to fill the rest half of the MinPED table for these bits.
(5) Use the sorted $2N_T \times 1$ discarded paths from ($D_{2NT-1\to 1}$) to update the MinPED table using the Relaxed LLR Computation scheme.
(6) Compute LLR values using the minimum PED data in the MinPED table for each of the $2N_T(\log_2(Q)/2)$ transmitted.

---

According to one embodiment of the present invention, the Soft-output K-Best MIMO detection approach can implement one or more of the innovative processes that significantly reduce computational complexity without a major sacrifice in bit error rate (BER) performance. The innovative processes may include:

1. a Relevant Discarded Paths Selection process;
2. a Last-Stage On-Demand Expansion process; and
3. a Relaxed LLR Computation process.

Relevant Discarded Paths Selection

Due to the On-Demand nature of child expansion, a Hard K-Best scheme only produces K–1 discarded paths at each tree level. The current Soft K-Best scheme would accumulate these K–1 discarded paths at each tree level. Hence, assuming that the discarded paths are utilized from L tree levels, a straightforward extension of the Hard K-Best scheme will still need to process a total of L(K–1) discarded paths to produce soft outputs.

Let us denote the partial paths at each tree level (paths from root node to an intermediate tree level) or the complete paths (paths from root node to the last tree level) by x, and a bit position within the path by j. Also denote the Minimum PED (MinPED) for the jth bit in x being '0' as MinPED0j and the Minimum PED for the jth bit being '1' as MinPED1j. The following three observations lead to the derivation of the first improvement idea, namely: selection and utilization of only relevant discarded paths.

1. For the Hard K-Best scheme, the K–1 discarded paths at each tree level are already sorted according their PED values.

2. Among the paths at a particular tree level and for jth bit in these paths, a K Best path will definitely yield smaller MinPED0j and MinPED1j, compared to a discarded path at that tree level.

3. If a particular discarded path does not provide any extra information (i.e. MinPED for one or more bits), then there is no advantage in storing and ZF augmenting that discarded path.

Based on these observations, the current improvement idea proposes to analyze the K best paths and the rest of the discarded paths at each tree level, and only select those discarded paths for further processing (ZF augmentation and LLR computation) that yield MinPED for at least one of the bits. The rest of the unselected discarded paths at that tree level should not be stored or processed any further, and hence they should be just abandoned. According to one embodiment, the relevant discarded paths are selected using the following process at each tree level:

Step 1: First, populate a Bit Occurrences table for the symbols corresponding to the current tree level and all previous levels, using the K best paths at the current tree level.

Step 2: Then, attempt to fill in the remaining entries in the Bit Occurrences table using the discarded paths accumulated and forwarded from the previous levels.

Step 3: At the end, examine each of the sorted discarded paths at the current level one by one (in the order of ascending PEDs), and select the current discarded path for further processing only if it fills at least one of the void entries in the Bit Occurrences table for the current tree level.

It is noted that for Level k, a bit occurrence table is simply a table of dimensions $2 \times (N_T-k-1) * (\log_2(Q)/2)$, that keeps track of occurrences of "0" and "1" values for $(NT-k-1)*(\log_2(Q)/2)$ bits (an $(N_T-k-1) \times 1$ real-valued vector) in the K-Best paths and accumulated chosen discarded paths. Thus, this improvement idea proposes to select and forward only the relevant discarded paths that contain useful information for LLR computation, out of the total $L(K-1)$ discarded paths. In other words, this improvement idea recognizes and eliminates the irrelevant discarded paths to reduce the overall computational complexity significantly. Through mathematical analysis, the largest number of selected discarded paths can be derived to be $((2N_T-1)(\log_2(Q)/2))-(K-1)$, for the given constellation size, antenna configuration and the value of K. It is noted that the number of selected discarded paths is the largest in the worst case scenario, when discarded paths are utilized from all of the intermediate tree levels and when all of the K-1 best paths at the last level only yield one different bit from all of the previous K best paths. Thus, this improvement idea results in large savings in computational complexity, since the Soft K-Best detection scheme now only needs to ZF augment, compute and compare the PED for a maximum of $((2N_T-1)(\log_2(Q)/2))-(K-1)$ paths. In one example embodiment, for 4×4 64-QAM MIMO detector with K=10 and L=6, a maximum of 12 paths need to be processed using this improvement idea, as opposed to the 54 discarded paths processed in the conventional techniques.

Last-Stage On-Demand Expansion

Another major issue with existing Soft K-Best schemes that leads to high computational complexity, is the exhaustive expansion of the paths at the last tree level. In other words, the existing Soft K-Best detection schemes exhaustively expand the K best paths at the level $2N_T-1$ to all possible $K\sqrt{Q}$ paths at level $2N_T$. These Soft K-Best schemes then compute PED for these exhaustively expanded $K\sqrt{Q}$ paths and compare these PEDs to compute the LLR values. Hence, for large constellations and for large values of K, this approach leads to a very large number of PED computations and comparisons. For example, for a 4×4 64-QAM MIMO detector with K=10, this will require computation and comparison of 80 PED values at the last tree level, to compute LLR values for 24 transmitted bits. Hence, this causes either large processing latency (defined as the number of cycles required to compute each new set of LLR values) for hardware constrained detectors or large hardware requirements for high-throughput detectors.

However, through careful analysis, it can be observed that within the complete set of $K\sqrt{Q}$ vectors, there are only K distinct $2N_T-1 \times 1$ symbol vectors, corresponding to the first $2N_T-1$ levels of the detection tree. Hence, the exhaustively extended $K\sqrt{Q}$ paths only improve the quality of LLR for the last $\log_2(Q)/2$ transmitted bits, that correspond to the last level of the detection tree. The exhaustive expansion of the K best paths at the level $2N_T-1$ to $K\sqrt{Q}$ paths at the level $2N_T$ does not yield any LLR quality improvement for the first $(2N_T-1)(\log_2(Q)/2)$ transmitted bits. Thus, the existing approach of exhaustively extending paths at the last level provides minimal BER performance gain, while requiring a large amount of extra resources for implementation.

To resolve these issues, an embodiment of the present invention uses the Last Stage On-Demand Expansion process as described below:

Step 1: First, extend (expand) the K best paths at tree level $2N_T-1$ to exactly K paths at level $2N_T$ using ZF augmentation.

Step 2: Use these K ZF augmented paths at tree level $2N_T$ to fill the MinPED table for the first $(2N_T-1)(\log_2(Q)/2)$ bits, because for these bits, the K ZF augmented paths at the level $2N_T$ yield the smallest PED values.

Step 3: For the last $(\log 2(Q)/2)$ bits:

3.1: First use the lowest PED ZF augmented path, from the K ZF augmented paths at level $2N_T$, to fill exactly half of the MinPED table for the last $(\log 2(Q)/2)$ bits.

3.2: Then, perform on-demand extension and use at most 2K-1 paths, in the order of ascending PEDs, to fill the remaining half of the MinPED table.

The Last Stage On-Demand Expansion scheme expands the K paths at the tree level $2N_T-1$ on-demand to only the 2K-1 relevant paths at level $2N_T$ for LLR computation purposes. The on-demand nature of path extension ensures that these 2K-1 paths have the lowest PED among the $K\sqrt{Q}$ paths. It also ensures that these paths are expanded and utilized to fill the MinPED table in the order of ascending PED. In other words, if a particular entry in the MinPED table is already filled, there is no need to compare the current MinPED with the PED for the paths extended afterward. Hence, this avoids PED comparisons at the last level for the purpose of filling the MinPED table and LLR computation.

Thus, the Last Stage On-Demand Expansion scheme according to an embodiment of the present invention reduces the number of path extensions from $K\sqrt{Q}$ to only 2K-1 and reduces the number of PED comparisons from $K\sqrt{Q}$ to 0.

Relaxed LLR Computation Scheme

A prior art Modified K-Best Schnorr-Euchner (MKSE) detection scheme performs LLR computation using the 3-step process shown below:

Step 1: First, fill the MinPED table for all $N_T \log_2(Q)$ bits using the last level extension of the K-Best paths.

Step 2: Then, examine each discarded path and compare its PED with the existing MinPEDs to attempt to fill or update the MinPED table.

Step 3: Use the minimum PED data in the MinPED table to compute LLR values (by simply subtracting the MinPEDs) for each of the $N_T \log_2(Q)$ transmitted bits.

As can be observed, the second step in this process requires comparison of each discarded path PED to the current $2N_T \log_2(Q)$ MinPEDs. Hence, this leads to a total of $(2N_T \log_2(Q))(L(K-1))$ comparisons, which in turn leads to a large computational complexity. However, if an assumption is made that the MinPED values attained by extending the K-Best paths are always smaller compared to the discarded path PEDs, then a large amount of computations can be avoided. This assumption is the basic idea behind the Relaxed LLR Computation Scheme in one embodiment of the present invention. One embodiment of the inventive Relaxed LLR Computation scheme modifies Step 2 in the LLR computation process as follows:

Step 2—Modified: For each discarded path, in the ascending order of PEDs, fill an entry in the MinPED table only if it is still empty.

Thus, the Relaxed LLR Computation Scheme according to one embodiment of the present invention does not perform any PED comparisons and fills an entry in the MinPED table, only if that bit was not covered by either the extended K-Best paths or the preceding discarded paths. Hence, this scheme essentially approximates output LLR values, rather than performing exact computation.

However, this assumption is not always valid, and hence might lead to degradation in LLR quality and hence in the resulting detector BER performance. This might happen in the following case: if for a particular bit, a discarded path has a smaller PED compared to the current MinPED value for that bit. This case is classified as an error case in the LLR computation and its corresponding error probability is quantified by simulating a 4×4 64-QAM MIMO detector for a large number of transmitted bits.

Referring to FIG. 1, an error percentage plot for a Relaxed LLR Computation scheme according to an embodiment of the present invention is shown. From the error percentage plot, it can be observed that the probability of error is higher at low SNR values and reduces significantly for higher SNR values. This can be explained by noticing that at low SNR values, the larger noise might cause good vectors to be discarded on the intermediate stages, which after ZF augmentation to the last level end up having smaller PED values than the K-Best vectors. It should be appreciated that the maximum value of error percentage is approximately 0.125% and the average is 0.03%. Thus, it can be concluded that the Relaxed LLR Computation scheme causes only minor LLR quality degradation, while reducing computational complexity by a large amount.

According to an embodiment of the present invention, the above discussed approaches for a low-complexity Soft-output K-Fast MIMO detection can be implemented using a deeply pipelined and highly parallel architecture. This novel architecture is designed to be area and power efficient, while offering very high detection throughput. Through physical synthesis, the novel architecture has been proven to support error correcting codes (ECC) coded data rates up to 1 Gbps with a detection throughput of up to 2 Gbps. Thus, this architecture can satisfy the aggressive requirements of the latest 4 G wireless standards such as IEEE 802.16m and LTE-Advanced.

Figure 2:
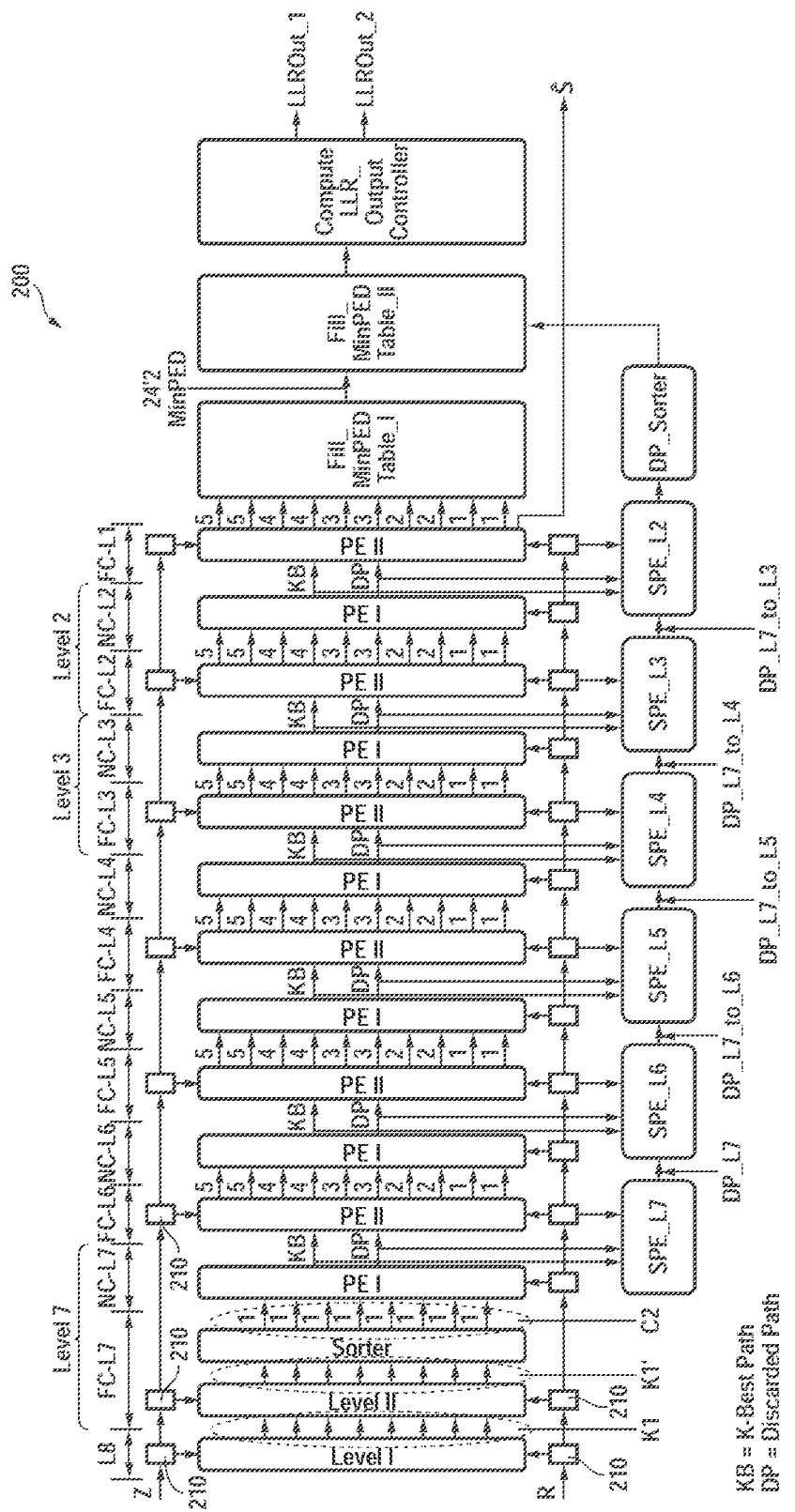
FIG. 2 is a simplified block diagram of a 4×4 64-QAM Soft-output K-Best MIMO detector with K=10, in accordance with an embodiment of the present invention.

FIG. 2 shows a simplified block diagram of a 4×4 64-QAM Soft-output K-Best MIMO detector 200 according to an embodiment of the present invention. Detector 200 includes an input terminal configured to receive an R matrix and a Z vector as defined in Equation (2). Using the real-value decomposition (RVD) scheme, the R matrix after the QR decomposition is an upper-triangular matrix and has symmetry features. In an embodiment, input entries R and Z are received and buffered in registers 210. In the example shown, the soft-output K-Best MIMO detector is described with K=10 and $\Omega=\{-7, -5, -3, -1, +1, +3, +5, +7\}$ and four transmit antennas ($N_T=4$). There are thus $2N_T=8$ tree levels. The first level of the tree (indicated as "L8"), which corresponds to the last row of Equation (2), opens up all the possible values in $\Omega$, and calculates their corresponding PED values. The output of this stage is K1 resulting in $|\Omega|=8$ PED values. For each of the nodes in $K_1$, the first child is found and its PED is updated using the FC (First Child)-Block in Level II. Detector 200 further includes a Sorter block that sorts all eight resulting PED values K1' in four clock cycles, to determine the lowest PED value.

The output of the Sorter block is the sorted FCs (First Children) of L7, i.e., $C_2$, which are all loaded simultaneously to the next stage PE I (Processing Element I). Note that the dashed gray arrows imply that the data is loaded only once after the completion of the previous stage, and the number on them shows how many clock cycles after the completion of the previous stage data is loaded. Generally speaking, in each level, one PE II (Processing Element II) block is used to generate and sort the list of all FCs of the current level and one PE I block is used to generate the K-Best list of the current level. This fact is denoted in FIG. 2 by FC-Li (First Children in i-th level) and NC-Li (Next Children in i-th level) labels under each level's block. The PE I block takes the FCs of each level and uses a PED sorter and a core called NC-Block in the feedback loop to generate the K-Best paths (indicated as KB) of that level one-by-one. The PE II receives the K-Best candidates of the previous level, one after the other, and generates the FC of each received K-Best candidate one-by-one, and sorts them as they arrive. It finally transfers them to its following PE I block for computation of the K-Best paths. Since at the last level only the FC with the lowest PED is of concern, only one PE II block is used for the first level (FC-L1), whose output is the solution to the hard detection symbol S representing the $2N_T\times1$-dimensional transmit vector.

Detector 200 further includes Soft-output processing element (SPE) blocks in intermediate tree levels (indicated as SPE_Li where I=7 to 2). The SPE blocks and DP Sorter blocks together create the discarded path (DP) datapath that only retains selected discarded paths from each tree level, performs ZF augmentation and PED computation for them and sorts them. The rest of the unselected discarded paths at that tree level won't be stored or processed any further, i.e., discarded. In one embodiment, the selection of the relevant discarded paths is performed according to the three steps of the Relevant Discarded Paths Selection process described above. The SPE block samples in the K-Best paths and K−1 discarded paths from PE I block at each level, as well as the accumulated selected discarded paths from all of the previous levels. It then observes the bit occurrences in the K-Best paths and accumulated selected discarded paths, and uses this observation to select and tag only useful discarded paths at the current level. The SPE block then computes ZF augmentation for all of the selected discarded paths using the FC-Block and updates their PED values. At the last tree level, the output of SPE_L2 block consists of only selected discarded paths having dimensions $2N_T\times1$, that have been fully ZF augmented to the last tree level. The output of SPE_L2 is coupled to a DP_Sorter block that is configured to sort all of the accumulated selected discarded paths in the order of ascending PEDs to prepare them to be used for LLR computation.

Detector 200 further includes a Fill MinPEDTable I block, Fill MinPEDTable II block and ComputeLLR Output Controller block connected in series at the last tree level (indicated as FC_L1). These three blocks perform the task of computing LLR values using the chosen discarded paths and extended K-Best paths at the last tree level. In one embodiment, the process of LLR computation can be performed in two steps. In the first step, the selected discarded paths and extended K-Best paths can be observed to fill a minimum PED (MinPED) table for each transmitted bit. In the second step, this MinPED table can be used to compute LLR values for each bit, by simply subtracting the MinPED values for each bit. In one embodiment, the Fill MinPEDTable I block initializes and fills the MinPED table using the $2N_T\times1$ paths generated through the Last Stage On-Demand Expansion process described above. The Fill MinPEDTable II block then updates this MinPED table using the accumulated selected discarded paths. The ComputeLLR OutputController block, which is the final stage of the Soft-output K-Best detector, computes LLR values for the transmitted bits and outputs them in parallel using the LLROut 1 and LLROut 2 ports.

Figure 3:
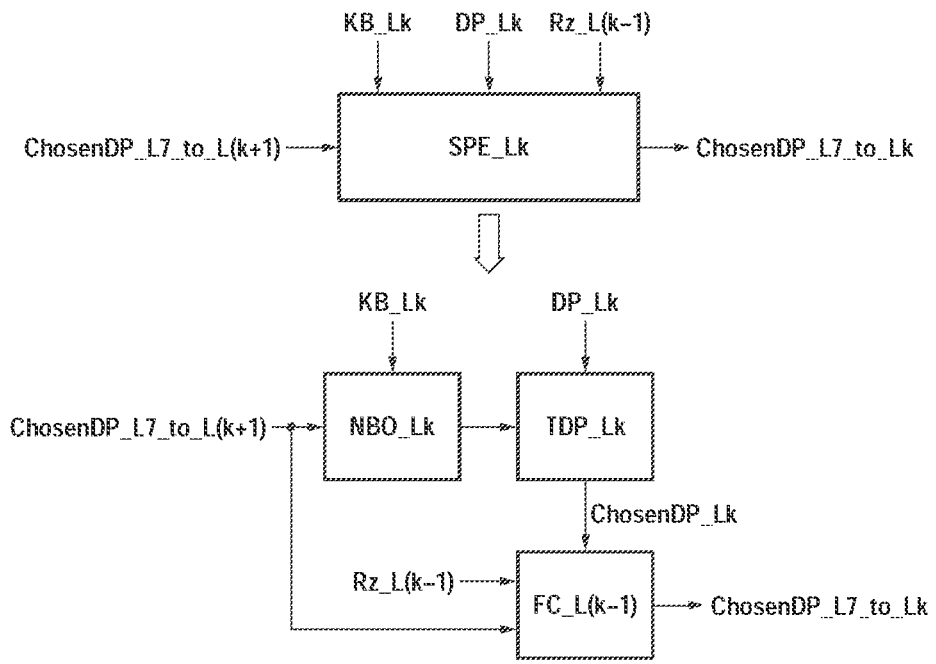
FIG. 3 shows a simplified single block diagram of a soft processing element sub-block according to an embodiment of the present invention.

FIG. 3 shows a simplified single block diagram of a soft processing element (SPE_Lk) for Level k according to an embodiment of the present invention. SPE_Lk block includes Note Bit Occurrence (NBO_Lk) block, a Tag Discarded Path (TDP_Lk) block coupled to the NBO_Lk block, and a First Child (FC_L(k−1)) block coupled to the TDP_Lk block. The NBO and TDP blocks together implement the Relevant Discarded Paths Selection process described above. The NBO block samples in K-Best paths from the current level ("KB_Lk") and accumulated ChosenDPs from the previous levels ("ChosenDP_L7_to_L(k+1)" These K-Best and discarded paths are then observed and utilized to fill the bit occurrence table at the current level. It is noted that for Level k, a bit occurrence table is simply a table of dimensions $2\times(N_T-k-1)(\log_2(Q)/2)$, that keeps track of occurrences of "0" and "1" values for $(N_T-k-1)(\log 2(Q)/2)$ bits $((N_T-k-1)\times 1$ real-valued vector) in the K-Best paths and accumulated ChosenDPs. The TDP_Lk block receives current level discarded paths and tags current the discarded paths at the current level if they contain information that is relevant for computing LLR values of transmitted bits in the next level. The FC_L(k−1) block receives the accumulated ChosenDPs from the previous levels and outputs selected discarded paths for the current level. The FC_L(k−1) block is configured to update a partial Euclidean distance (PED) value of a first child using one or more multiplier blocks that are described in detail below.

Multiplication Block

Figure 4:
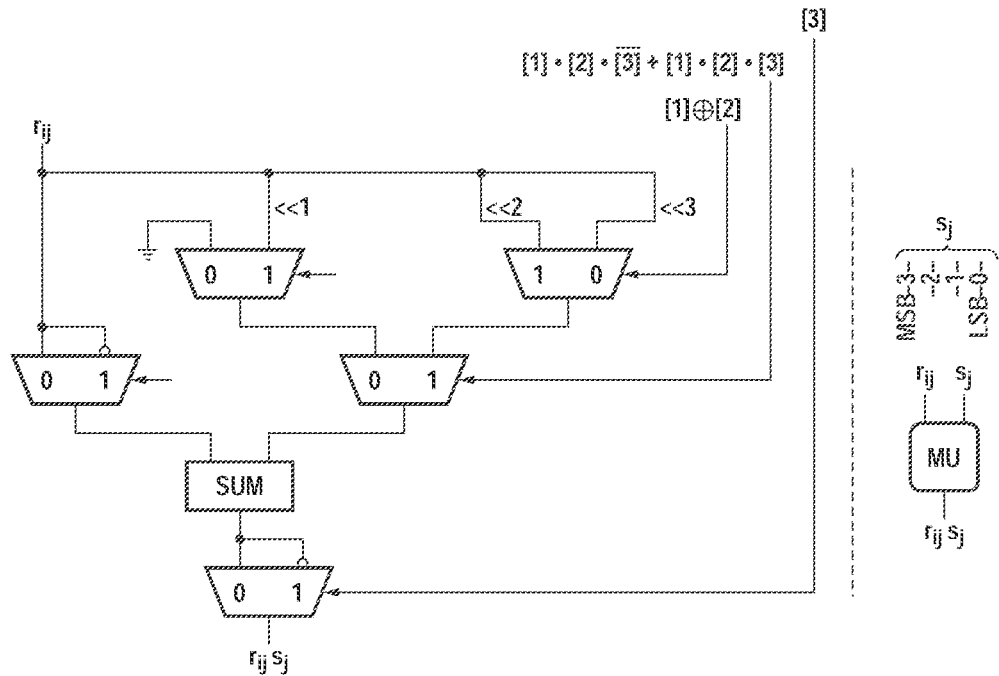
FIG. 4 is a simplified logic block diagram of a multiplication block according to an embodiment of the present invention.

The overall Soft K-Best detector architecture shown in FIG. 2 involves two types of multiplications. The multiplication of $\tilde{z}_i * r_{ij}$ and $s_i * r_{ij}$. In one embodiment, the first multiplication can be realized using 13-bit×13-bit multipliers, and the second multiplication can be implemented using an alternative architecture, which takes less area and has a much smaller critical path. FIG. 4 is a block circuit schematic illustrating this architecture using multiplexers having two inputs and an adder (indicated as "SUM"). As shown in FIG. 4, the numbers on the right represent the bit location in $s_j$ (i.e., $s_j$ can be represented with 4 bits), "<<n" represents n shifts to the left and the tiny bubble "-∘" denotes the negation operation. It should be appreciated that all of the fixed-point numbers use the two's complement representation.

It should be appreciated that this simple implementation of the multiplication operation, $s_i * r_{ij}$, is possible because the values of $s_i$ are drawn from a finite pre-determined odd-integer set $\Omega=\{(-\sqrt{Q}+1),\ldots,-1,+1,\ldots,(+\sqrt{Q}-1)\}$, where Q is the constellation size (or constellation order). The structure of the MU block is such that the adder always produces one of the odd multiples of $r_{ij}$ (i.e., $r_{ij}, 3r_{ij}, 5r_{ij}, 7r_{ij}$), depending on the value of $s_i$. The multiplexers before the adder perform the function of selecting correct operands for the adder. The first operand of the adder can be either of $r_{ij}$ or $-r_{ij}$, and the second operand of the adder can be any of 0, $2r_{ij}$, $4r_{ij}$ or $8r_{ij}$. The multiplexer in the last stage, after the adder, utilizes the Most Significant Bit (MSB) of $s_j$ to make the decision on whether or not to negate the output $s_i * r_{ij}$.

This way of implementation of the multiplication operation is much faster than a normal multiplier implementation. The motivation for designing the MU block is due to the fact that this multiplication lies in the critical path of the architecture, which is on a feedback path. Since the fine-grained pipelining technique cannot be used in the feedback path to improve the overall throughput, an efficient implementation of the multiplier using this scheme is critical to enhance the maximum operating frequency for the Soft K-Best detector.

Note Bit Occurrence (NBO) Block

Figure 5:
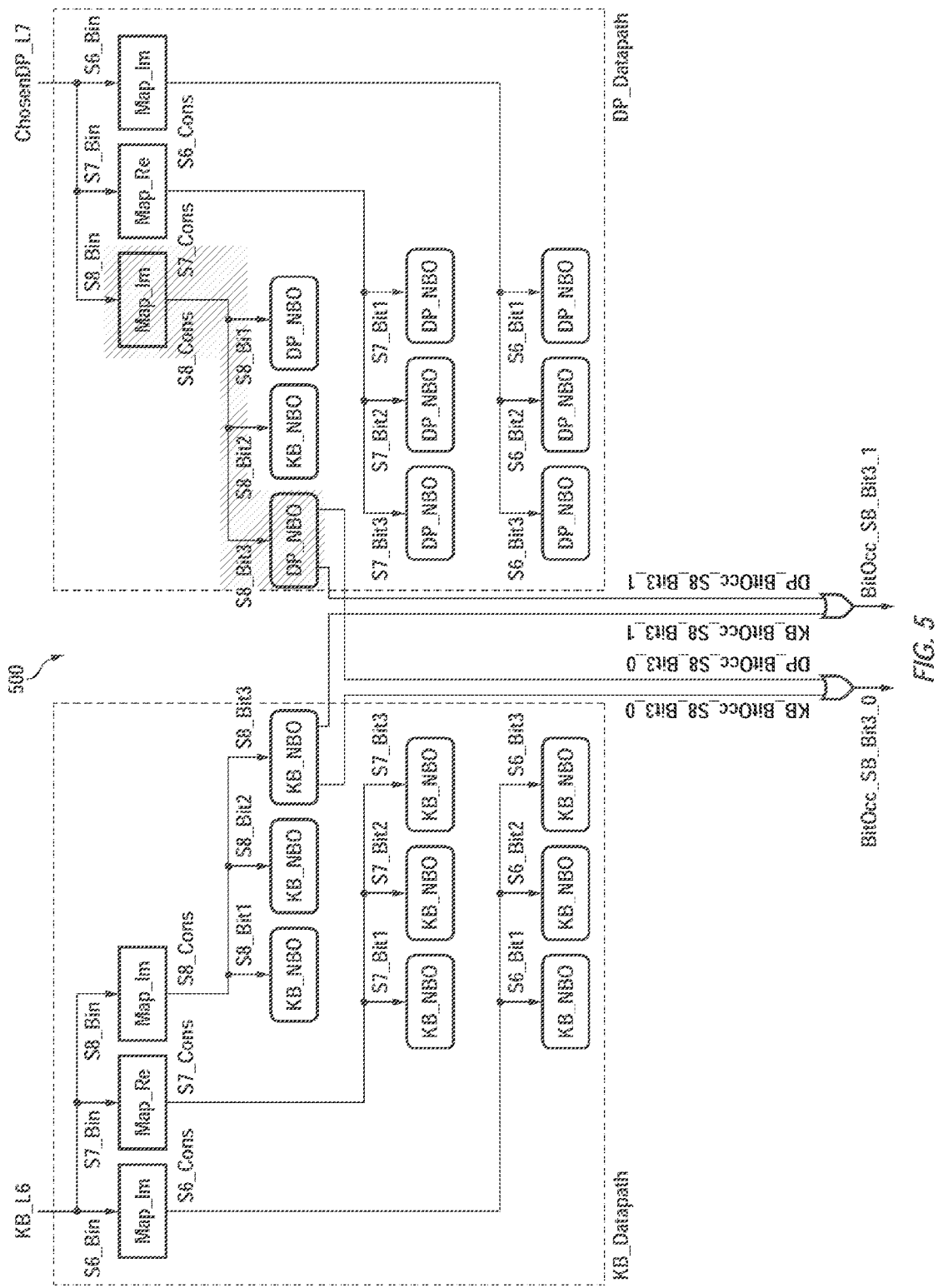
FIG. 5 is a simplified block diagram of a Note Bit Occurrences (NBO) block with critical path highlighted according to an embodiment of the present invention.

FIG. 5 is a simplified block diagram of a Note Bit Occurrences (NBO) block 500 for Level 6 (NBO_L6) with critical path highlighted according to an embodiment of the present invention. The NBO block includes two parts: a KB Datapath and a DP Datapath. The KB Datapath and DP Datapath parts independently fill the bit occurrence tables for K-Best paths and accumulated ChosenDPs, respectively, in a completely parallel manner. The logical OR operation at the NBO block output then merges these two independent bit occurrence tables. In each of these datapaths, the process of filling the bit occurrence table is carried out in two steps. In the first step, the input symbol in binary two's complement representation is converted to its constellation representation. The second step then uses this constellation representation to update the bit occurrence table using the blocks KB_NBO and DP_NBO. The overall critical path of the NBO block is also shown in FIG. 5, which consists of MapBin2Constellation Re/Im and DP NBO sub-blocks.

Figure 6:
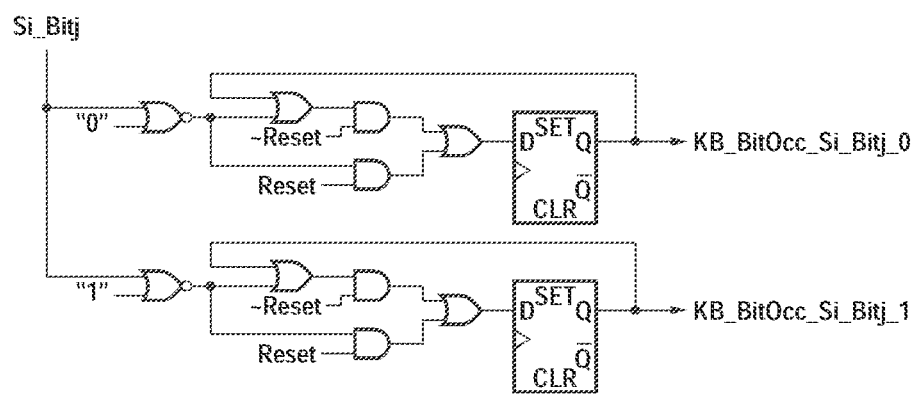
FIG. 6 is a simplified logic block diagram of a KB_NBO sub-block according to an embodiment of the present invention.

FIG. 6 shows a simplified block diagram of a KB_NBO sub-block according to an embodiment of the present invention. The KB_NBO sub-block uses logical XNOR operations with "0" or "1" to determine whether the current bit is "0" or "1". In one embodiment, the KB NBO sub-block uses a special mechanism to reset the KB bit occurrence table, using the logical OR and AND operations. This special reset mechanism is required since the KB NBO sub-block needs to be active for all K=10 clock cycles and there are no idle cycles available for register reset. Hence, KB NBO needs to be reset in the same clock cycle when the first K-Best path is processed.

Figure 7:
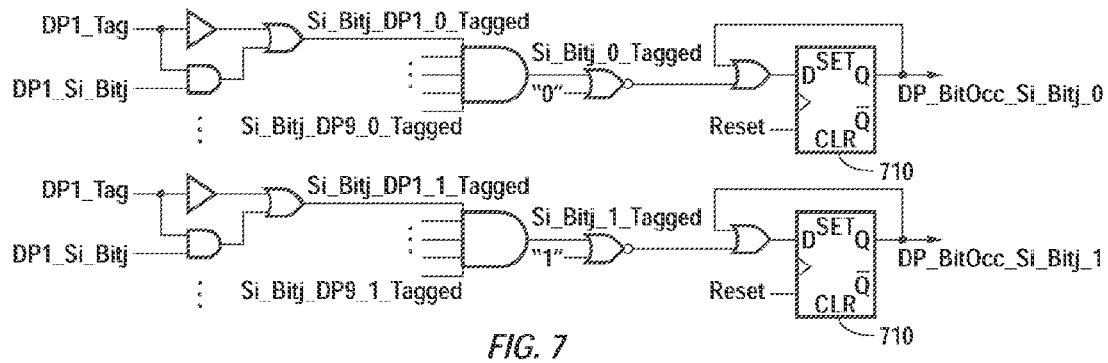
FIG. 7 is a simplified logic block diagram of a DP_NBO sub-block according to an embodiment of the present invention.

FIG. 7 shows a simplified block diagram of a DP_NBO sub-block according to an embodiment of the present invention. The DP_NBO sub-block uses logical XNOR operations with "0" or "1" to determine whether the current bit is "0" or "1". The DP NBO sub-block can be reset by simply resetting registers 710. In an embodiment, the DP NBO includes a tagging mechanism at its inputs. The tagging mechanism may be implemented using NOR and NAND logical operations and is configured to recognize and tag bits that are associated with selected relevant discarded paths.

Figure 8:
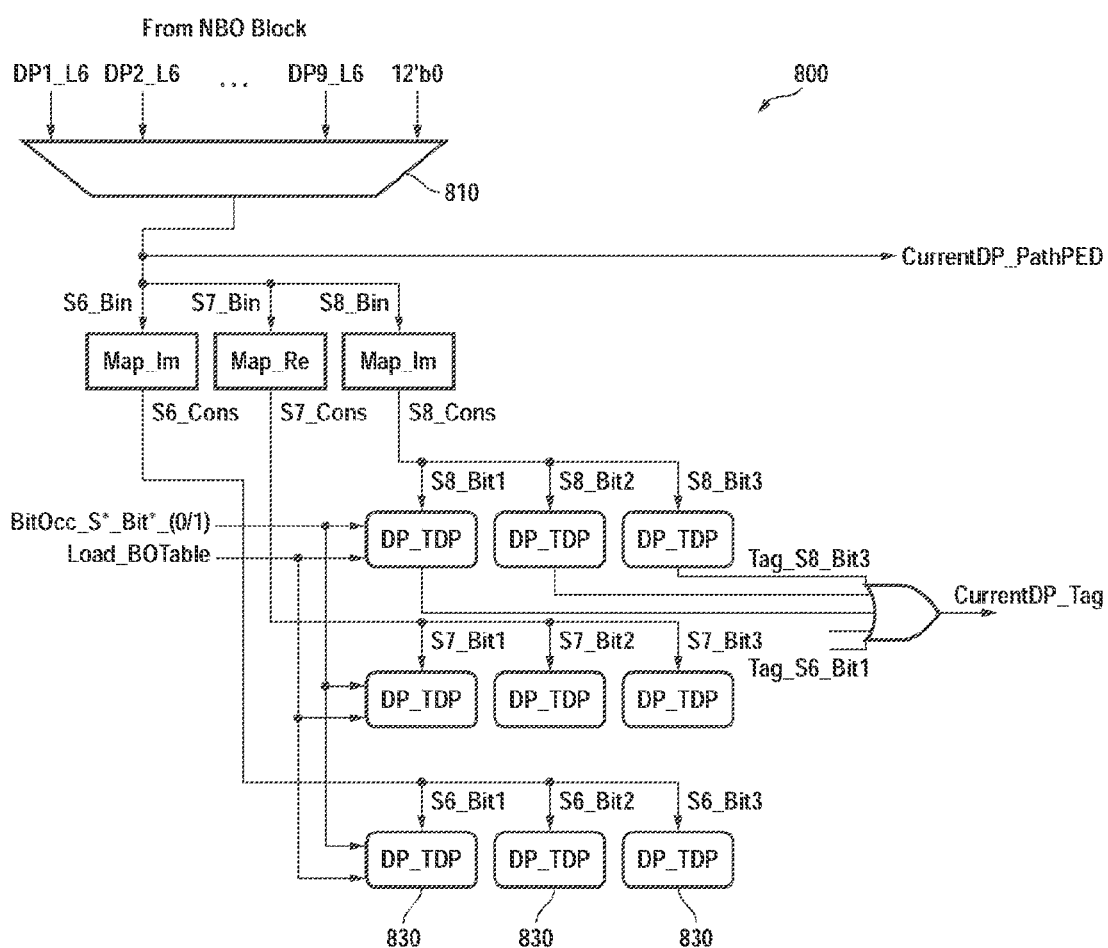
FIG. 8 is a simplified block diagram of a Tag Discarded Paths (TDP) block according to an embodiment of the present invention.

FIG. 8 shows a simplified lock diagram of a Tag Discarded Paths (TDP) block 800 according to an embodiment of the present invention. TDP block 800 includes a selector circuit 810 configured to receive 9 (nine) discarded paths and utilizes the bit occurrence table prepared by the NBO block (shown in FIG. 5) to observe and tag each of the 9 discarded paths at the current level. In other words, a discarded path will be selected for further processing and will be tagged "1" only if it fills a void entry in the present bit occurrence table. TDP block 800 includes a "Load_BOTable" signal for loading the bit occurrence table into appropriate DP_TDP sub-blocks 830, from the NBO block outputs. Once the bit occurrence table is loaded, selector circuit 810 selects the current discarded path to be processed. The combination of MapBin2Constellation Re/Im and DP TDP sub-blocks are then used to compute the tags for individual bits. In one embodiment, the overall tag for the current discarded path, "CurrentDP Tag", is computed by using a logical OR operation.

Figure 9:
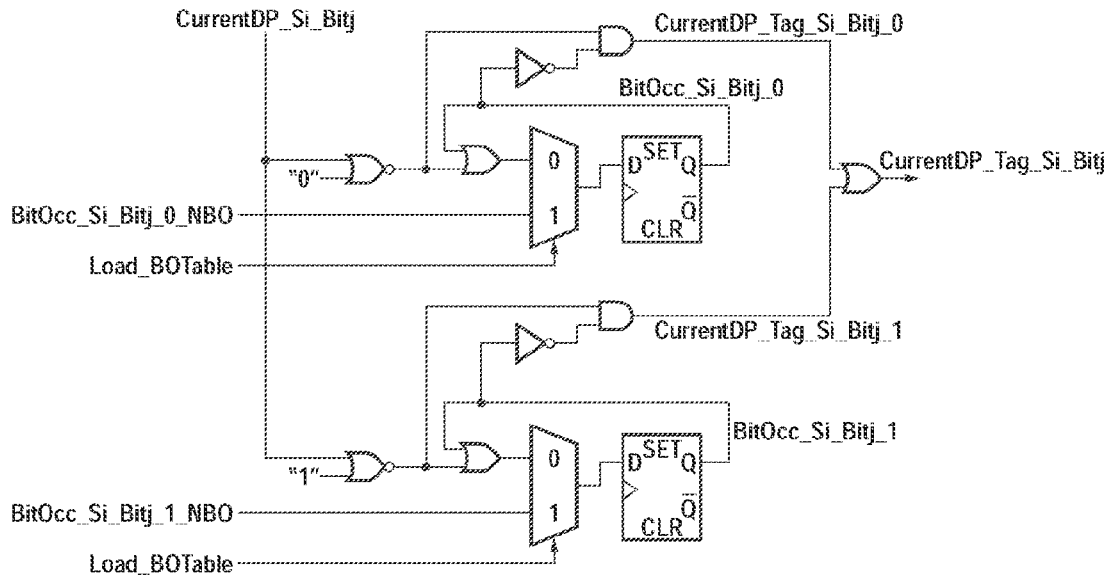
FIG. 9 shows a simplified logic block diagram of a DP_TDP sub-block for a single bit according to an embodiment of the present invention.

FIG. 9 shows a simplified logic block diagram of a DP_TDP sub-block for a single bit according to an embodiment of the present invention. The DP_TDP sub_block detects whether the current discarded path will yield useful information for LLR computation in future and selects (tags) the discarded path if it is relevant. The DP_TDP sub_block uses logical XNOR operation coupled with "0" and "1" to determine whether the current bit is "0" or "1" and to update the bit occurrence table. In an embodiment, the complete process of selecting and tagging a discarded path is performed in a single clock cycle, and hence the critical path for the overall TDP block contains all of the sub-blocks from the DP inputs to the "CurrentDP Tag" output signal.

Figure 10:
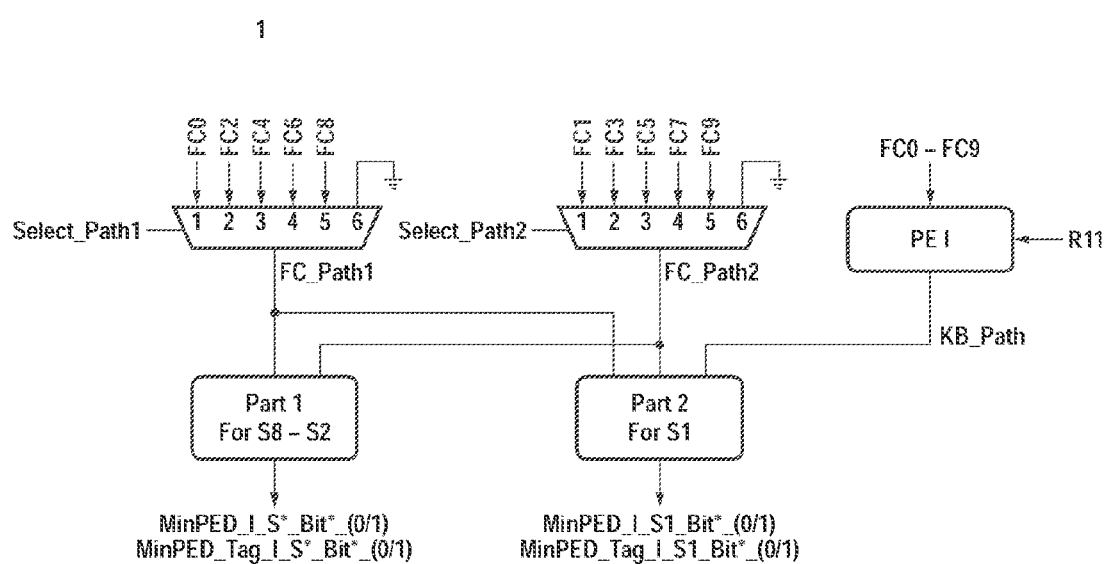
FIG. 10 is a simplified block diagram of a Fill_MinPED-Table_I block according to an embodiment of the present invention.

FIG. 10 shows a simplified block diagram of a FILL_Min-PEDTable_I block according to an embodiment of the present invention. The Fill MinPEDTable I block is the first block, in the set of 3 serial blocks that perform LLR computation. The Fill MinPEDTable I block performs the task of initializing and filling the minimum PED (MinPED) table using the last level extension of K-Best paths. In other words, the Fill Min-PEDTable I block samples in ZF augmented 10 $2N_T \times 1$ K-Best paths, processes them and utilizes them to generate the MinPED table and the corresponding MinPED tag values. The Fill MinPEDTable I block includes 3 sub-blocks: a PE I sub-block, a Part 1 sub-block and a Part 2 sub-block.

In an embodiment, the PE I sub-block is identical to the one used in the hard K-Best datapath, as shown in FIG. 2. It receives the sorted list of ZF augmented 10 K-Best paths at level $2N_T-1$ and uses an On-Demand path extension scheme to generate a list of K-Best paths at Level $2N_T$. Since the On-Demand expansion scheme uses Schnorr-Euchner (SE) enumeration, the 10 K-Best paths are generated one-by-one, in the order of ascending PEDs. These K-Best paths are then utilized in the Fill MinPEDTable I Part2 sub-block to fill the MinPED table.

As shown in FIG. 10, Fill_MinPED Table 1 block includes multiplexors 1010, 1020 configured to select the current ZF augmented path and transfer them to the "FC Path1" and "FC Path2" ports at each clock cycle. The Fill MinPEDTable I Part1 and Fill MinPEDTable I Part2 sub-blocks then utilize these ZF augmented K-Best paths ("FC Path1" and "FC Path2") and the K-Best paths from the PE I sub-block ("KB Path") to populate the MinPED table for $N_T \log_2 (Q)$ bits and compute their tags.

Figure 11:
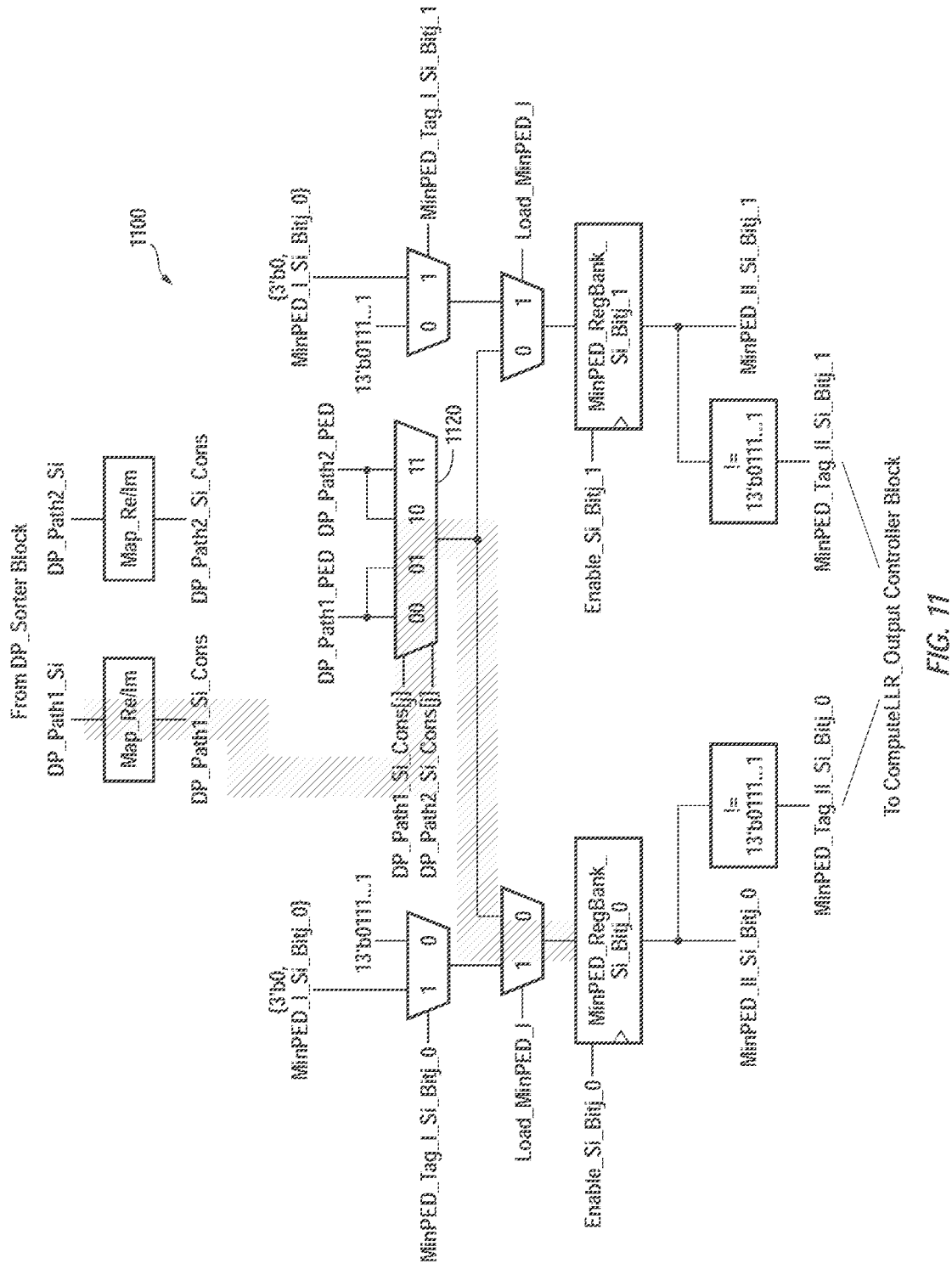
FIG. 11 is a simplified single functional block diagram of a Fill_MinPEDTable_II block with the critical path highlighted according to an embodiment of the present invention.

FIG. 11 shows a simplified single functional block diagram 1100 of a FILL_MinPEDTable II block according to an embodiment of the present invention. Single functional block diagram 1100 is configured to store and update a minimum PED (MinPED) value for j-th bit of i-th transmitted symbol. In one embodiment, the Fill MinPEDTable II block includes 24 instances of this single functional diagram block 1000 and is configured to perform the task of updating the MinPED table using the PED values of the chosen (selected) discarded paths that have been ZF augmented in the last tree level. As shown in FIG. 11, block diagram 1100 includes MapBin2Constellation Re/Im sub-blocks (indicated as "Map_Re/Im") that are configured to attain constellation representation of the "Si" symbols for both "DP_Path1_Si" and "DP_Path2_Si" from the DP_Sorter block (not shown). These constellation representations are then used as select signals for a multiplexer 1120 that selects the minimum PED among "DP_Path1_PED" and "DP_Path2_PED", to generate the "Current_DP_MinPED" value. The two branches on left and right sides of multiplexer 1120 perform the task of storing and updating the MinPED for "0" and "1" values of the current bit, respectively. It is noted that since the PED word-length for K-Best and discarded paths are respective 10 bits and 13 bits in one embodiment, the input 10-bit MinPED values from the Fill MinPEDTable I block needs to be converted to 13-bit fixed-point format.

In one embodiment, the Fill_MinPEDTable_II block, which includes 25 instances of single block 1100, implements the Relaxed LLR Computation process described in sections above. It is noted that FIG. 11 also shows the critical path of the Fill MinPEDTable II block.

In one specific embodiment, it is assumed that the MinPED values attained by extending the K-Best paths are smaller than the PED values of the discarded path. Hence, there is no need to compare the "Current_DP_MinPED" value with the current MinPED value stored in the MinPED register bank. This results in significant hardware savings since comparators are not needed. At the final output of the Fill_MinPED-Table_II block, the updated MinPED tags are computed by comparing the current stored MinPED with 13'b0111111111111. These computed MinPED tags are then utilized by the subsequent ComputeLLR_OutputController block, to significantly ease the process of LLR computation.

The ComputeLLR Output Controller is the last block in the pipelined architecture of the proposed Soft K-Best MIMO detector. This block receives the table of MinPED values, that has been populated using the last level extension of K-Best paths and the FC augmented selected discarded paths. It uses these MinPED values and their corresponding tags to compute the Log-likelihood Ratio (LLR) values for 24 ($N_T * \log_2$ (Q)=4*$\log_2$(64)=24) transmitted bits.

Figure 12:
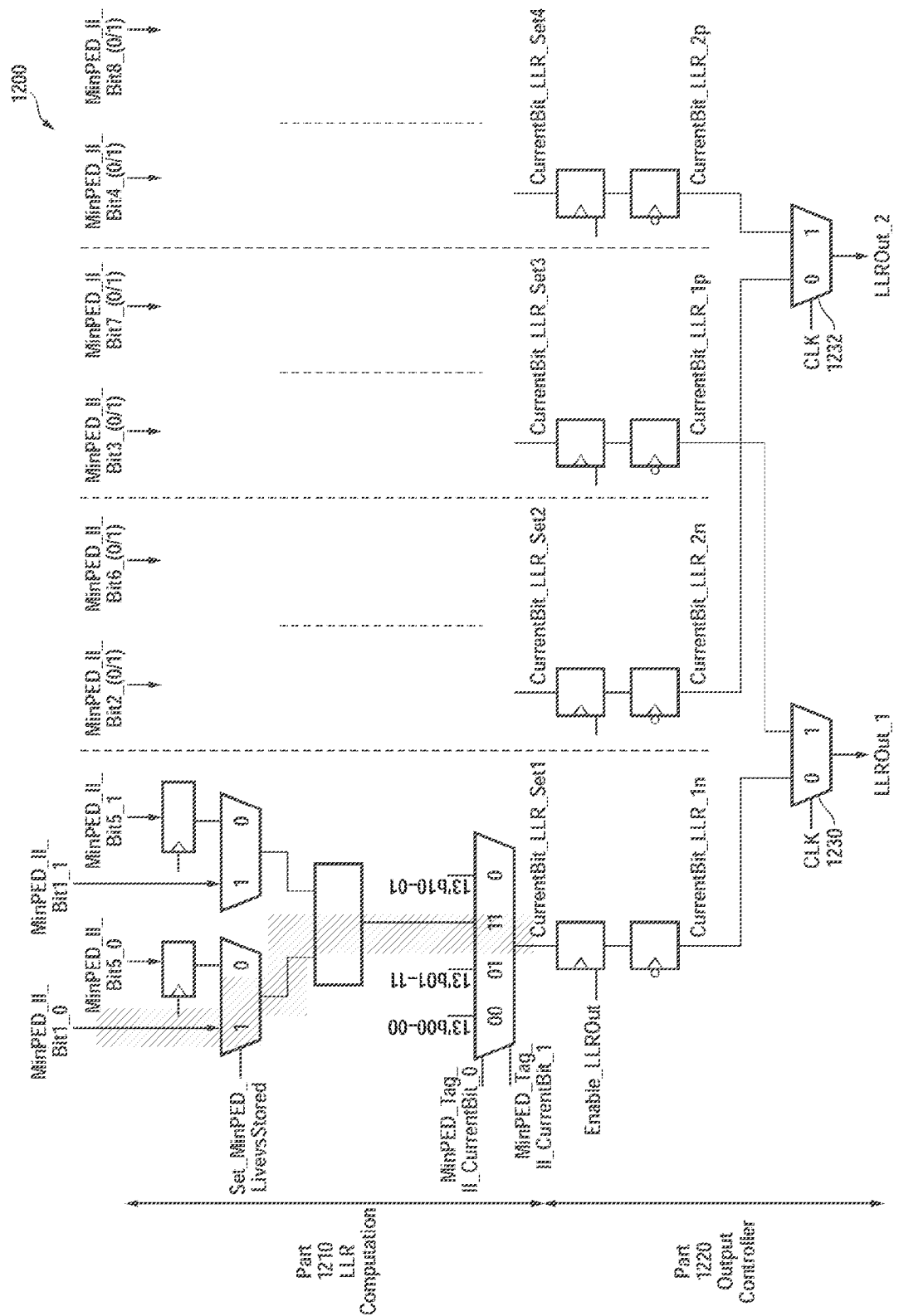
FIG. 12 is a block diagram of a ComputeLLR Output Controller block with the critical path highlighted according to an embodiment of the present invention.

FIG. 12 shows a block diagram of a ComputeLLR Output Controller block 1200 according to an embodiment of the present invention. As shown in FIG. 12, ComputeLLR Output Controller block 1200 is divided into a LLR computation part, indicated as Part 1210, and a output controller part, indicated as Part 1220. Part 1210 includes a logic circuitry configured to compute LLR values using the MinPED table and an interface circuit having multiplexers configured to generate appropriate values for the "MinPED II Bitj (0/1)" signals. Part 1210 selects MinPED values for one of the bits each cycle, using the control signal "Sel_MinPED LivevsStored", which is set to "0" in cycle 1 and to "1" in cycle 2, in each set of 2 cycles. Note that the MinPED transfer scheduling between the Fill MinPEDTable II and the ComputeLLR Output Controller blocks creates the need for register banks to sample and store the MinPED values for the second bit. The chosen bit MinPED values for "0" and "1" are then subtracted to compute LLR values using Equation (4). The ComputeLLR Output Controller block then utilizes the MinPED tag values to check validity of the computed LLRs and decide on the correct output LLR values.

Part 1220 functions as an Output Controller to output computed LLR values for 24 transmitted bits according to an embodiment of the present invention. Part 1220 includes two sets of register banks connected in series and being configured to reduce the critical path length. The clock driven multiplexers 1230, 1232 then output two LLR values per clock cycle (one at each of the positive and negative edges of clock) at the ports "LLROut_1" and "LLROut_2". Thus, each port in the second part of the ComputeLLR Output Controller block outputs 12 LLR values within 6 clock cycles, in each set of 10 cycles.

Figure 13:
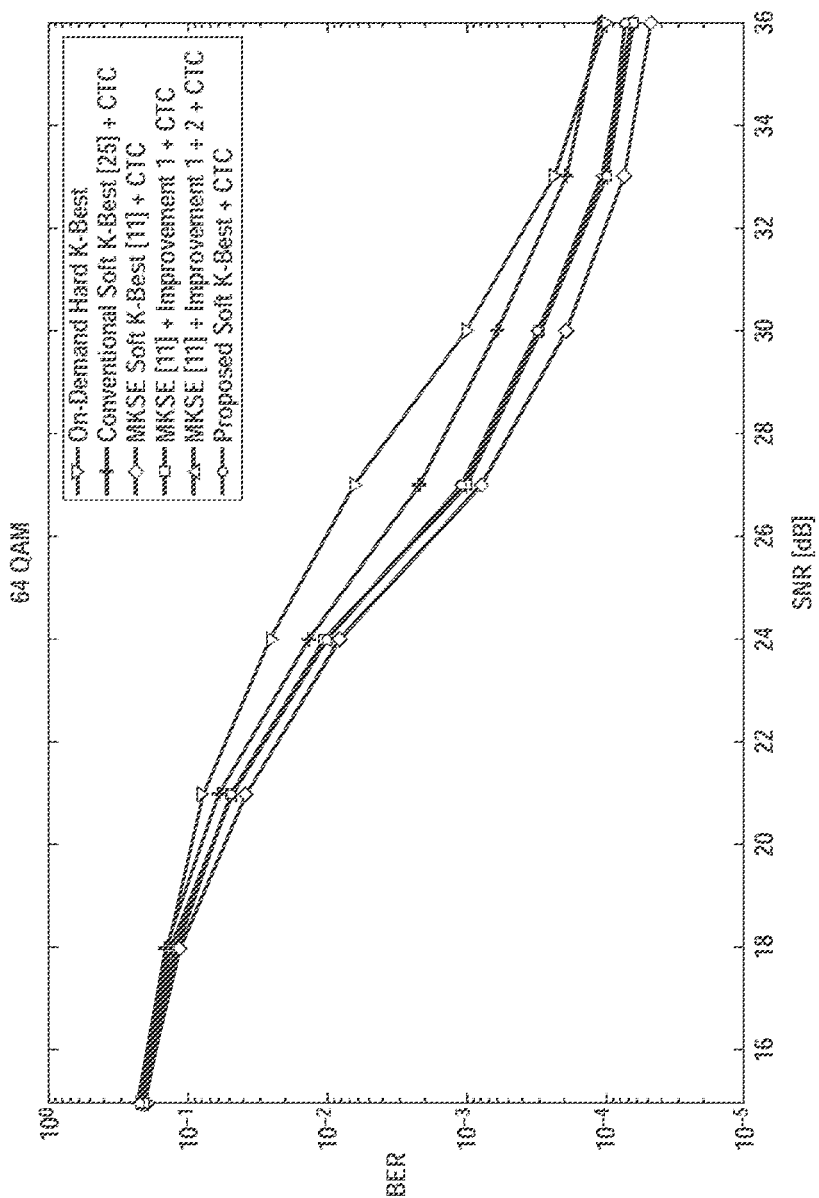
FIG. 13 is a graph illustrating the BER performance of the present invention vs. conventional art for a 4×4 MIMO system with 64-QAM.

FIG. 13 is a graph illustrating the BER performance of the present invention vs. conventional art for a 4×4 MIMO system with 64-QAM. From the BER curves, it can be noticed that the first innovative scheme, Relevant Discarded Paths Selection, causes the largest BER performance degradation compared to the other two innovative schemes. The Relevant Discarded Paths Selection scheme results in approximately 0.4 dB loss at BER=$10^{-3}$, compared to the MKSE detection scheme. This BER degradation is due to the following case: For a particular bit, ZF augmentation of an unselected discarded path yields smaller final Euclidean distance compared to the final Euclidean distance for ZF extension of a chosen discarded path. This error case causes LLR quality degradation, and hence BER performance degradation, compared to the case where all K−1 discarded paths at each tree level are forwarded for LLR computation. However, the other two innovative schemes, Last Stage On-demand Expansion and Relaxed LLR Computation, only cause approximately 0.1 dB and 0.04 dB loss at BER=$10^{-3}$, respectively. This is consistent with the observation made from the Error Percentage plot (FIG. 1) for the Relaxed LLR Computation scheme, that shows that the probability of error is about 0.03% on average. Thus, in total, for the 64-QAM case, the present invention results in 0.54 dB loss compared to the MKSE scheme presented in Z. Guo and P. Nilsson, "Algorithm and implementation of the K-Best sphere decoding for MIMO detection," *IEEE Journal on Selected Areas in Communication*, vol. 24, no. 3, pp. 491-503, March 2006 (indicated as "[11]" in FIG. 13), while reducing the number of computations required for LLR calculation by a factor of 5 (five). However, it should be appreciated that the present invention improves the BER performance by about 1.7 dB and 2.9 dB compared to the conventional Soft K-Best scheme and the Hard K-Best scheme at BER=$10^{-3}$, respectively.

The above embodiments of the present invention are illustrative and not limiting. Various alternatives and equivalents are possible. Other additions, subtractions or modifications are obvious in view of the present disclosure and are intended to fall within the scope of the appended claims.

What is claimed is:

1. A method for soft-output K-Best MIMO detection, the method comprising:
    receiving a vector associated with data bits transmitted over a multiple-input multiple output (MIMO) system, the MIMO system having N transmit antennas, N being an integer greater than unity;
    processing the received vector using a plurality of processing elements, the processing elements being arranged in a plurality of levels and connected in series; and
    computing Log-likelihood Ratio (LLR) values for the transmitted data bits; and
    expanding K paths at a level 2N−1 to 2K−1 paths at a last level 2N, wherein K is an integer greater than one.

2. The method of claim 1, wherein the plurality of levels comprises 2N levels.

3. The method of claim 1 further comprising:
    retaining selected discarded paths from intermediate levels within the 2N levels;
    computing partial Euclidean distance (PED) values in the intermediate levels utilizing the retained selected discarded paths; and
    sorting the PED values.

4. The method of claim 1 further comprising a relevant discarded paths selection process, the relevant discarded paths selection process comprising:
    examining paths at the intermediate levels; and
    selecting discarded paths for computing the LLR values.

5. The method of claim 1, wherein the 2K−1 paths have the lowest PED values among K*√Q paths, Q being an integer of a constellation symbol size.

6. The method of claim 1, wherein the 2K−1 paths are sorted in the order of ascending PED values.

7. The method of claim 1 further comprising a relaxed LLR computation process, the relaxed LLR computation process comprising:
    filling a PED table using K paths having the lowest LLR values in the last level; and
    filling empty entries in the PED table with discarded paths in the ascending order of PED values.

8. A soft-output K-Best multiple input multiple output (MIMO) detector, the detector comprising:
    an input terminal configured to receive a vector associated with transmitted bits over a multiple-input multiple output (MIMO) system, the MIMO system having N transmit antennas, N being an integer greater than unity;
    a plurality of processing elements connected in series and arranged in a plurality of levels, the processing elements being configured to compute Log-likelihood Ratio (LLR) values for the transmitted bits and expand K paths at a level 2N−1 to 2K−1 paths at a last level 2N, wherein K is an integer greater than one.

9. The soft-output K-Best MIMO detector of claim 8, wherein the plurality of levels comprises 2N levels.

10. The soft-output K-Best MIMO detector of claim 8 further comprising an output terminal having two output ports configured to output the computed LLR values of the transmitted bits in parallel.

11. The soft-output K-Best MIMO detector of claim 8, wherein the plurality of processing elements is configured to:
    retain selected discarded paths from intermediate levels within the plurality of levels;
    compute partial Euclidean distance (PED) values in the intermediate levels utilizing the retained selected discarded paths; and
    sort the PED values.

12. The soft-output K-Best MIMO detector of claim 8, wherein the plurality of processing elements is configured to:
    examine paths at intermediate levels within the plurality of levels; and
    select discarded paths for computing LLR values.

13. The soft-output K-Best MIMO detector of claim 8, wherein the 2K−1 paths have the lowest PED values among K*√Q paths, Q being a size of a constellation symbol.

14. The soft-output K-Best MIMO detector of claim 8, wherein the 2K−1 paths are sorted in the order of ascending PED values.

15. The soft-output K-Best MIMO detector of claim 8, wherein the plurality of processing elements is configured to:
    fill a PED table using K best paths in a last level; and
    fill empty entries in the PED table with discarded paths in the ascending order of PED values;
    wherein the K best paths comprise the lowest LLR values in the last level.

* * * * *